(12) United States Patent
Lecchi et al.

(10) Patent No.: US 12,486,908 B2
(45) Date of Patent: Dec. 2, 2025

(54) CRYOGENIC BALL VALVE

(71) Applicant: Buti Research S.r.L., Cenate Sotto (IT)

(72) Inventors: Stefano Lecchi, Bolgare (IT);
Pierangelo Scaglia, Voghera (IT)

(73) Assignee: Buti Research S.r.L., Cenate Sotto (IT)

( * ) Notice: Subject to any disclaimer, the term of this patent is extended or adjusted under 35 U.S.C. 154(b) by 23 days.

(21) Appl. No.: 18/765,939

(22) Filed: Jul. 8, 2024

(65) Prior Publication Data
US 2025/0043871 A1    Feb. 6, 2025

(30) Foreign Application Priority Data

Aug. 1, 2023   (IT) .................... 102023000016191

(51) Int. Cl.
*F16K 5/06*    (2006.01)
*F16K 27/06*    (2006.01)

(52) U.S. Cl.
CPC .......... *F16K 5/0657* (2013.01); *F16K 27/067* (2013.01)

(58) Field of Classification Search
CPC ................. F16K 5/0657; F16K 27/067; F16K 2200/501; F16K 5/0636
See application file for complete search history.

(56) References Cited

U.S. PATENT DOCUMENTS

| | | | | |
|---|---|---|---|---|
| 5,117,858 | A * | 6/1992 | Osthues | F16K 5/201 251/315.12 |
| 7,887,024 | B2 * | 2/2011 | Timko | F16K 5/0694 251/315.08 |
| 11,808,379 | B2 * | 11/2023 | Newton | F16K 31/60 |
| 2019/0040960 | A1 * | 2/2019 | Kim | F16K 5/0689 |

FOREIGN PATENT DOCUMENTS

| | | |
|---|---|---|
| CN | 205908794 U | 1/2017 |
| RU | 2716645 C1 | 3/2020 |

* cited by examiner

*Primary Examiner* — Michael R Reid
(74) *Attorney, Agent, or Firm* — Patterson Intellectual Property Law, PC

(57) ABSTRACT

A cryogenic ball valve is provided, particularly for cold box applications, which allows high flow rates with low pressure drops, which is easily serviceable even in a condition installed in a line, and in which heat transfer between valve parts at different temperatures under operating conditions is as low as possible.

14 Claims, 12 Drawing Sheets

CRYOGENIC BALL VALVE

CROSS-REFERENCES TO RELATED APPLICATIONS

This application claims benefit of Italian Patent Application No. 102023000016191, filed Aug. 1, 2023, and which is hereby incorporated by reference in its entirety.

BACKGROUND

The present invention falls generally within the technical field of valves for cryogenic applications. In particular, the invention relates to a cryogenic ball valve with an extended configuration. Such a valve has a preferred, although not exclusive, use in cold box applications.

Valves for cryogenic applications, or briefly cryogenic valves, must ensure particularly high performing standards, which often require special design solutions in order to simultaneously meet many different, and sometimes mutually conflicting, requirements, determined by both operation at cryogenic temperatures overall, and additional constraints that may arise from specific applications.

An application filed for cryogenic valves where such need is particularly evident is represented by cold boxes. Basically, these are containers of different sizes intended to house and thermally insulate equipment, such as, for example, heat exchangers, separators, distillation columns, absorbers, etc., in which processes at cryogenic temperatures have to be performed. The space inside a cold box that is not taken by such equipment, hydraulic lines and instrumentation required for the operation thereof, and associated support structures, is completely filled with a thermally insulating material, typically perlite. Under operating conditions, the interior of a cold box is therefore not accessible, and all devices that require direct actuation by an operator and/or inspection/servicing, and among them cryogenic valves, must be configured and arranged in the cold box in such a way that a portion thereof can be accessed from outside the cold box to allow the above operations. To meet these requirements, it is known to employ cryogenic valves with a so-called "extended" configuration.

Valves with an extended configuration have a stem, called "extended stem," having a greater length than in standard valves. This provides the necessary spacing between valve components that come in contact with the cryogenic fluid—in particular, the valve body with the closure member and the associated sealing seat(s)—and must therefore be located in the thermally insulated space inside the cold box, and the valve actuation means, that must instead be accessible from outside the cold box, in a space typically at room temperature.

Moreover, valves with extended configurations typically also comprise an extended valve body, i.e., a valve body provided at the top with an extension that increases the height of the valve in proportion to the length of the extended stem. The valve body extension generally consists of a tubular element connected to the valve body, which delimits a free space around the extended stem and defines, at the longitudinal end opposite the valve body, a valve top entry opening.

When used in a cold box, a valve with an extended configuration can be installed so that a portion thereof including the top entry opening is located outside the cold box. This allows valve components or component assemblies requiring inspection, servicing, or replacement—typically, the closure member or a cartridge comprising the closure member and the associated sealing seat(s)—to be removed and inserted even with the valve installed in a line and the cold box under operating condition, i.e., filled with the thermally insulating material.

Heat transfer between valve parts at cryogenic temperature and those at a higher temperature, particularly at room temperature, is an issue to be considered when using cryogenic valves with an extended configuration. Such heat transfer can be either conductive, through the valve components, or convective, due to convective motions that can arise inside the valve, in the space enclosed by the valve body extension. Such phenomena, of course, negatively affect the preservation of the required cryogenic operating conditions and must therefore be reduced as much as possible.

The need to simultaneously meet the above set of requirements limits the range of known cryogenic valves suitable for a cold box application.

Currently, in fact, almost exclusively cryogenic globe valves with extended configuration are considered for such an application. The particularly simple design of globe valves has relatively low servicing needs, which are essentially limited to the globe closure member. The latter can be made with relatively small transverse dimensions, which allow adopting valve body extensions having correspondingly small transverse dimensions, i.e. only slightly larger than the stem transverse dimensions. As a result, it is possible to provide cryogenic globe valves with extended configuration that simultaneously ensure both in-line serviceability and a minimization of valve size and free volumes within the valve, in order to limit conductive and convective heat transfer that may occur between valve parts that in operation are at different temperatures.

Globe valves, however, are not always suited for the required performance from a fluid-dynamic viewpoint, because of their relatively low flow rates and relatively high pressure drops.

BRIEF SUMMARY

In view of the above, the present disclosure relates to a cryogenic valve, particularly for cold box applications, which allows high flow rates with low pressure drops, which is easily serviceable even in a condition installed in a line, and in which heat transfer between valve parts at different temperatures under operating conditions is as low as possible.

The present disclosure further relates to a valve with the above features that also has an as far as possible simple structure and can be manufactured at competitive costs.

In one embodiment, a cryogenic ball valve comprises: a valve body comprising a fluid inlet port and fluid outlet port having a respective axis; a valve body extension delimiting, together with the valve body, a valve inner chamber and defining a valve top entry opening; a removable bonnet closing the top entry opening; a closure member assembly removably received in the valve body and comprising a ball closure member, a sealing seat, and a support cage supporting the ball closure member and the sealing seat, wherein the ball closure member is rotatable relative to the valve body, the support cage, and the sealing seat between a valve open position, in which the ball closure member allows a fluid flow through the valve body, and a valve close position, in which the ball closure member sealingly engages the sealing seat and prevents a fluid flow through the valve body; an extended stem comprising a first end connected to the ball closure member and a second end protruding from the inner chamber through the removable bonnet and intended to be connected to valve actuation means, and a thermal insulation assembly removably received in the inner chamber and configured so as to thermally separate a first region of the inner chamber adjacent to the valve body from a second region of the inner chamber adjacent to the top entry opening.

The closure member assembly, the stem, and the thermal insulation assembly form a removable unit which can be inserted/removed in one piece into/from the inner chamber through the top entry opening.

The support cage of the closure member assembly comprises a cup-shaped element having a lateral wall laterally surrounding the ball closure member and comprising a fluid inlet port and a fluid outlet port respectively coaxial with the fluid inlet port and the fluid outlet port of the valve body, and a bottom wall supporting the ball closure member.

The lateral wall of the cup-shaped element comprises, at an outer side thereof, at least one first contact surface, and the valve body comprises, at an inner side of a lateral wall thereof, at least one second contact surface, wherein the at least one first contact surface and the at least one second contact surface do not cross the axes of the fluid inlet ports and of the fluid outlet ports of the cup-shaped element and of the valve body and abut against each other preventing displacements of the closure member assembly and the valve body relative to each other in a peripheral direction thereof.

Within the framework of this description and the subsequent claims, the following definitions apply.

By "cryogenic temperature" it is meant a temperature equal to or lower than −150° C. (123 K).

By "cryogenic" it is meant a device intended to operate at cryogenic temperatures or an application or process requiring cryogenic temperatures.

By "extended stem" in a valve with extended configuration it is meant a stem having a total length, evaluated between the two free longitudinal ends thereof, greater than the sum of the maximum extensions in longitudinal direction (heights) of the valve body, valve body extension, and valve bonnet.

By "longitudinal direction" or "longitudinally" it is meant a direction parallel to the axis of the stem.

By "free volume" of the valve inner chamber, delimited by the valve body extension and the valve body, it is meant the difference between the total volume of such cavity and the volume of the portion of the stem received in such cavity.

The combination of the above-mentioned features allows a cryogenic valve with an extended configuration to be achieved that advantageously combines excellent performance from a fluid-dynamic viewpoint, effective thermal separation between valve parts operating at different temperatures, and ease of servicing even in condition installed in a line.

More specifically, the choice of a ball-type valve allows high flow rates with minimal pressure drop to be ensured.

The larger cross-sectional dimensions of the closure member assembly (cartridge) of a ball valve compared to those of the closure member assembly of, for example, a globe valve of the same size, require using a valve body extension with correspondingly larger cross-sectional dimensions, which involve a larger free volume within the cavity delimited by the valve body extension itself, keeping the valve length the same.

Thanks to the thermal insulation assembly, however, in the valve of the invention it is possible to prevent, or in any case substantially reduce, heat transfer, particularly convective heat transfer, within the free volume between the valve body and the closure member assembly, which under operating conditions are at cryogenic temperature, and the upper part of the valve with the actuation means, which under operating conditions may instead be at higher temperatures, typically at room temperature.

The thermal insulation assembly, the closure member assembly and the stem are connected, in particular removably connected, to each other to form a single removable unit. All removable assemblies and components of the valve of the invention can thus be inserted/extracted together and simultaneously into/from the valve inner chamber through the top entry opening. Inspection and/or servicing operations on the valve of the invention can thus be carried out particularly easily and quickly, even when the valve is installed in a line.

Furthermore, the contact surfaces respectively formed in the lateral wall of the cup-shaped element of the support cage supporting the ball closure member and in the lateral wall of the valve body, by abutting against each other, define a mechanical lock that prevents any rotations of the closure member assembly relative to the valve body when the valve is actuated, i.e., when the ball closure member rotates. Such rotations may occur especially in trunnion-mounted ball valves when, as in the present invention, the ball closure member is rotatably supported by a support cage of the closure member assembly rather than by the valve body, and/or when so-called "torque seated" configurations, such as double eccentric configurations, are adopted, where an actuation torque has to be continuously applied also in the valve closing configuration to provide the required contact pressure between closure member and sealing seat. Moreover, the aforementioned contact surfaces can also act as a guide for proper centering of the closure member assembly in the valve body when inserting the removable unit into the valve. Due to the extended configuration, this operation may in fact be more difficult, particularly when the valve is installed in a line at an angle relative to the vertical direction.

Additionally, as it will become more apparent also from the description of various embodiments of the invention, the above-mentioned features can be implemented through relatively simple design solutions that can be easily scaled to different valve sizes, which positively affects also manufacturing costs.

In various embodiments, the thermal insulation assembly has an annular configuration, and the stem longitudinally extends through the thermal insulation assembly.

Conveniently, the stem extends through the thermal insulation assembly substantially without mechanical interference. Advantageously, therefore, the rotation of the stem when actuating the valve is not affected by the presence of the thermal insulation assembly.

In various embodiments, the thermal insulation assembly comprises thermal insulation means and support and/or containment means of the thermal insulation means, and the support and/or containment means are removably connected to the support cage of the closure member assembly.

In various embodiments, the thermal insulation means have a cross-sectional surface area substantially equal to the cross-sectional surface area of a free volume of the valve inner chamber, wherein by "substantially equal" it is meant here that the above-mentioned two surface areas are equal leaving out negligible differences due to the presence of walls or other elements of the support and/or containment means of the thermal insulation means, and/or to clearance required for assembly. The thermal insulation means thus also effectively act as a mechanical barrier that limits convective motions in the longitudinal direction that may arise under operating conditions in the valve inner chamber.

Preferably, the thermal insulation means longitudinally extend, either continuously or discontinuously, in the valve inner chamber over a length of between 0.65·L and 0.85·L, wherein L is the total length of the valve inner chamber, i.e., of the valve body extension.

By these choices, the thermal insulation means can take, in a longitudinally continuous or discontinuous manner, a substantial fraction of the free volume of the valve inner chamber, while still leaving sufficient space to perform assembly/disassembly maneuvers of the corresponding support and/or containment means to/from the support cage of the closure member assembly.

According to an embodiment, the support and/or containment means of thermal insulation means comprise a tubular annular containment chamber, and the thermal insulation means substantially fill the containment chamber.

In this case, the thermal insulation means can be conveniently formed as solid body made of a thermally insulating material, in one piece or several pieces, and shaped to match the shape of the containment chamber.

According to another embodiment, which is particularly advantageous for reducing the total weight in the case of large valves, the thermal insulation means comprise two or more annular disks of thermally insulating material longitudinally spaced apart from one another.

Preferably, the at least one first contact surface formed in the lateral wall of the cup-shaped element of the support cage supporting the ball closure member and the at least one second contact surface formed in the lateral wall of the valve body are flat surfaces or comprise flat surfaces.

According to an embodiment, the at least one first contact surface is or comprises a flat surface arranged parallel or perpendicular to the axis of at least one of the fluid inlet opening and the fluid outlet opening of the cup-shaped element, and the at least one second contact surface is or comprises a corresponding flat surface arranged parallel or perpendicular to the axis of at least one of the fluid inlet opening and the fluid outlet opening of the valve body.

According to another embodiment, the at least one first contact surface delimits a recess or protrusion formed in the lateral wall of the cup-shaped element, and the at least one second contact surface delimits a complementary-shaped protrusion or recess formed in the lateral wall of the valve body.

Conveniently, the lateral wall of the cup-shaped element may comprise two first contact surfaces arranged at opposite sides relative to the axes of the fluid inlet port and the fluid outlet port of the cup-shaped element, and the lateral wall of the valve body may correspondingly comprise two second contact surfaces arranged at opposite sides relative to the axes of the fluid inlet port and the fluid outlet port of the valve body.

Preferably, the ball closure member comprises a trunnion and the valve of the invention is a trunnion-mounted ball valve.

Preferably, the ball closure member has a rotation axis having an offset relative to a center axis of the valve along two mutually perpendicular directions in a plane perpendicular to the rotation axis and center axis, so as to obtain a double eccentric valve configuration.

In various embodiments, the stem comprises a hollow portion, which can be conveniently formed by a prefabricated tubular element. This allows a lightening of the component, which is particularly convenient in the case of extended stems, and also makes the manufacture thereof easier as compared to a solid one-piece stem, because the required machining tolerances can be more easily kept.

In various embodiments, the hollow portion of the stem is filled with a thermally insulating material.

Conveniently, the valve as disclosed herein may comprise a jacket enclosing the valve body extension and the valve body and forming a preferably evacuated cavity around them (vacuum jacket). The use of an external jacket is advantageous when the valve is to be installed in a space that is not thermally insulated, e.g. a space at room temperature. When the valve is used in spaces that are per se thermally insulated, such as the interior of a cold box, the jacket can be omitted.

BRIEF DESCRIPTION OF THE DRAWINGS

Further features and advantages of an invention as disclosed herein shall become more evident from the following detailed description of embodiments thereof, made hereinafter, for illustrating and non-limiting purposes, with reference to the accompanying drawings.

DETAILED DESCRIPTION

Figure 1:
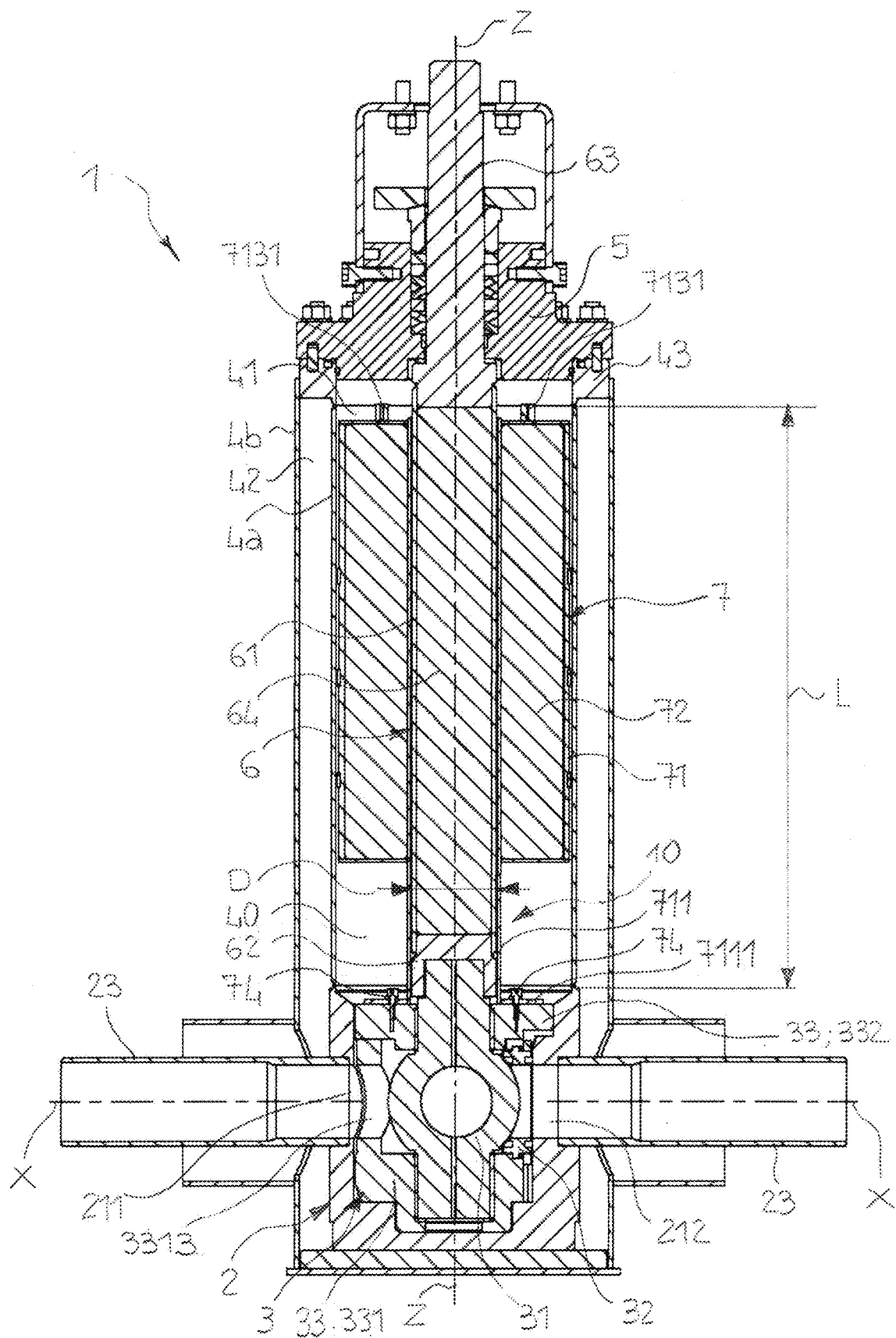
FIG. 1 is a schematic longitudinal sectional view of an embodiment of a cryogenic ball valve as disclosed herein.
Figure 1A:
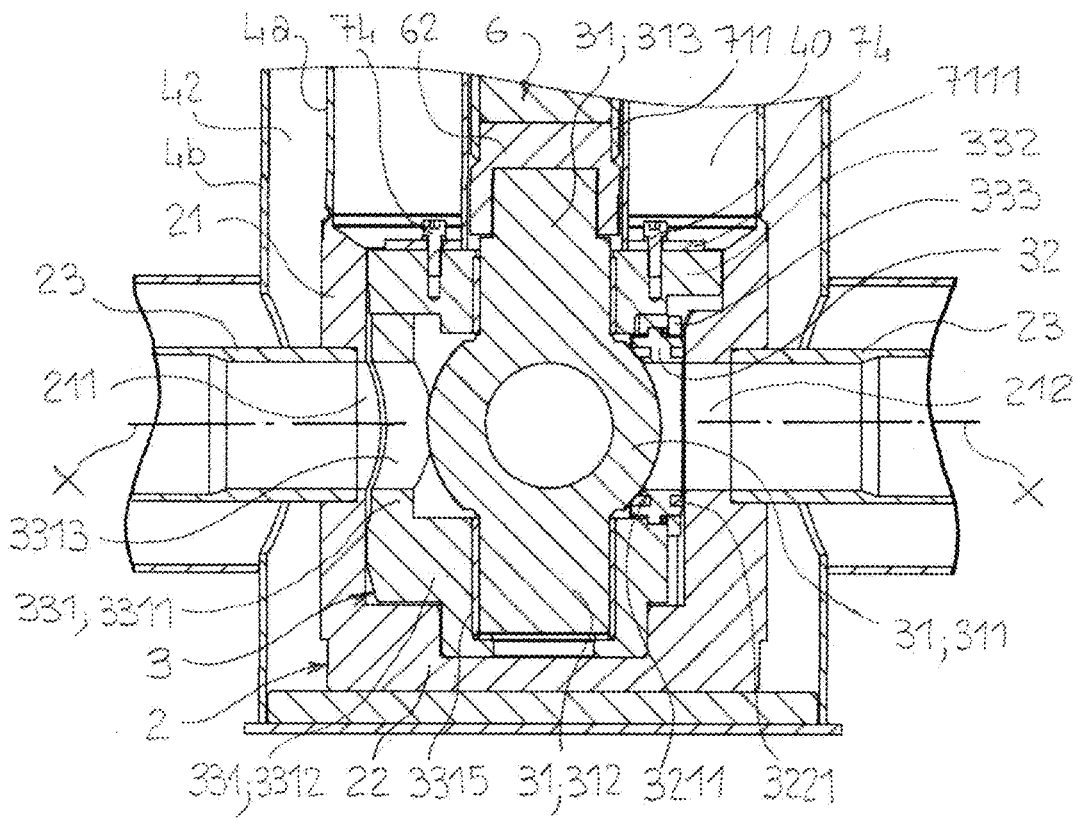
FIGS. 1a, 1b are schematic longitudinal sectional views of a portion of the valve in FIG. 1 comprising the valve body and closure member assembly, in a valve closing configuration and a valve opening configuration, respectively.
Figure 1B:
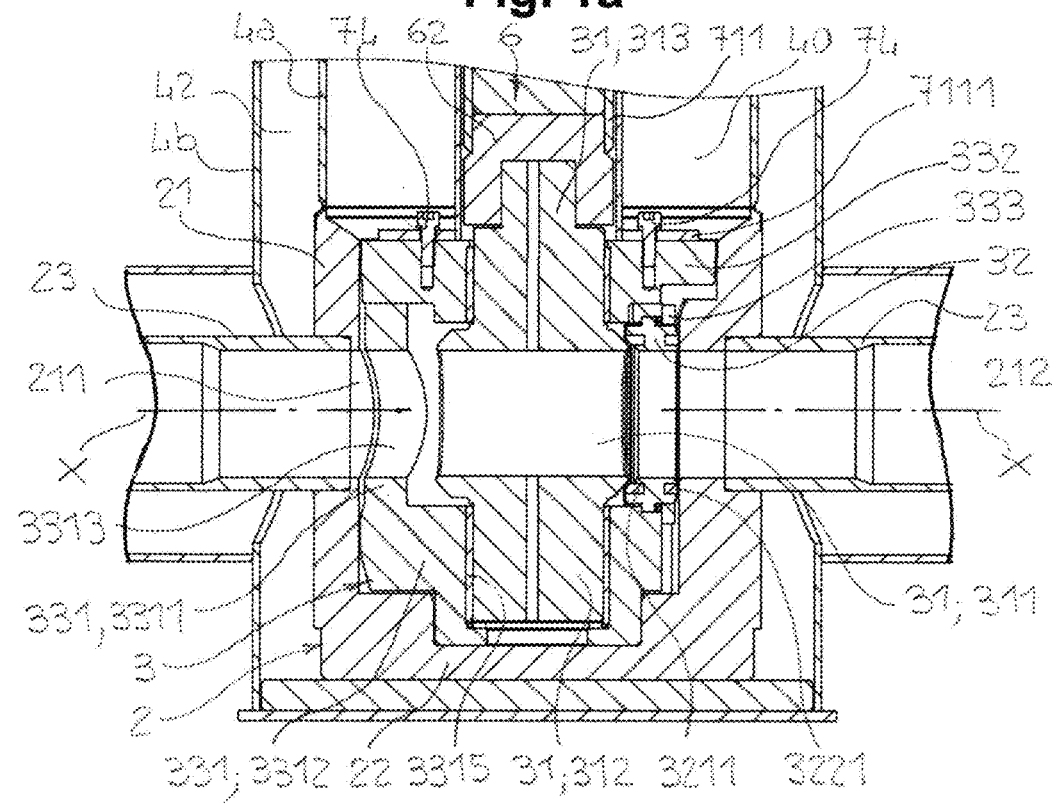

FIGS. 1-8 show an embodiment of a cryogenic ball valve according to the invention, generally indicated by reference numeral 1.

Figure 2:
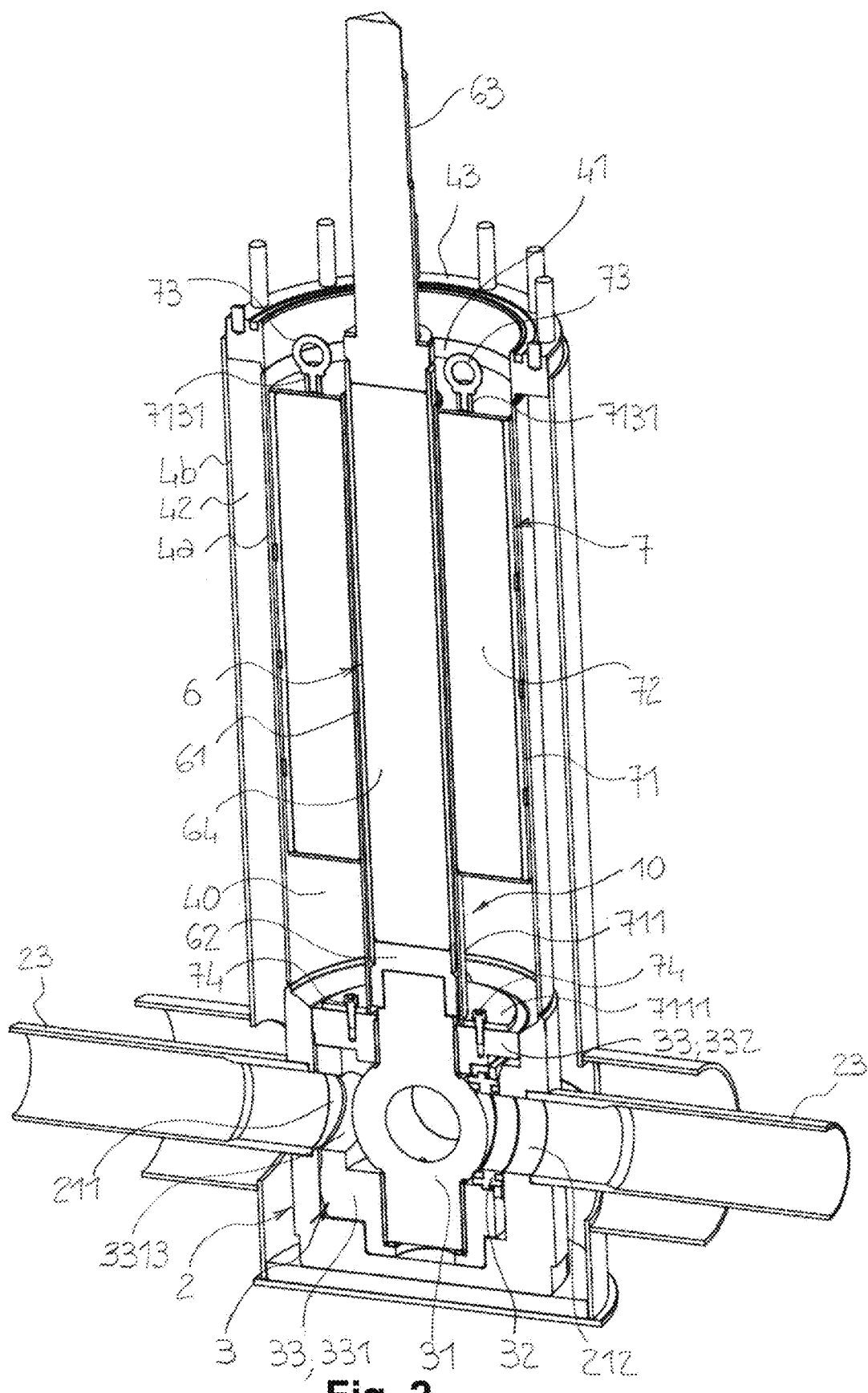
FIG. 2 is a schematic longitudinal sectional perspective view of the valve in FIG. 1, where the valve bonnet has been removed.

As apparent in particular from FIGS. 1 and 2, the valve 1 comprises a valve body 2, a closure member assembly 3 removably received in the valve body 2, a valve body extension 4a delimiting, together with the valve body 2, an inner chamber 40 of the valve 1 which can be accessed through a top entry opening 41 of the valve 1, a jacket 4b enclosing the valve body extension 4a and the valve body 2, a removable bonnet 5 which closes the inner chamber 40 at the top entry opening 41, a stem 6, and a thermal insulation assembly 7 removably received in the inner chamber 40, between the valve body 2 and the top entry opening 41 i.e., the bonnet 5.

The valve body 2, visible in particular in FIGS. 1, 1a-b, 2, and 3, is preferably made in one piece and comprises a generally cylindrical lateral wall 21 and a bottom wall 22, which overall give the valve body 2 a cup-like configuration A fluid inlet port 211 and a fluid outlet port 212 are formed in the lateral wall 21. In the embodiment shown here, the fluid inlet port 211 and the fluid outlet port 212 have a common axis X-X, however, in general, they could also have respective non-coincident axes (angled valve). A mounting fitting 23 for mounting the valve 1 in a line (not shown) is associated to each of the ports 211, 212. By way of example, the mounting fittings 23 are configured here as fittings for a weld-joint mounting, however they could be configured for any other kind of mounting, in particular also releasable, known to the person skilled in the art. Valve body 2 could also comprise more than one fluid inlet port 211 and/or more than one fluid outlet port 212 (three-way or multi-way valve).

The valve body 2 delimits a cavity 20 (visible in FIG. 3) in which the closure member assembly 3 is removably received.

Figure 6:
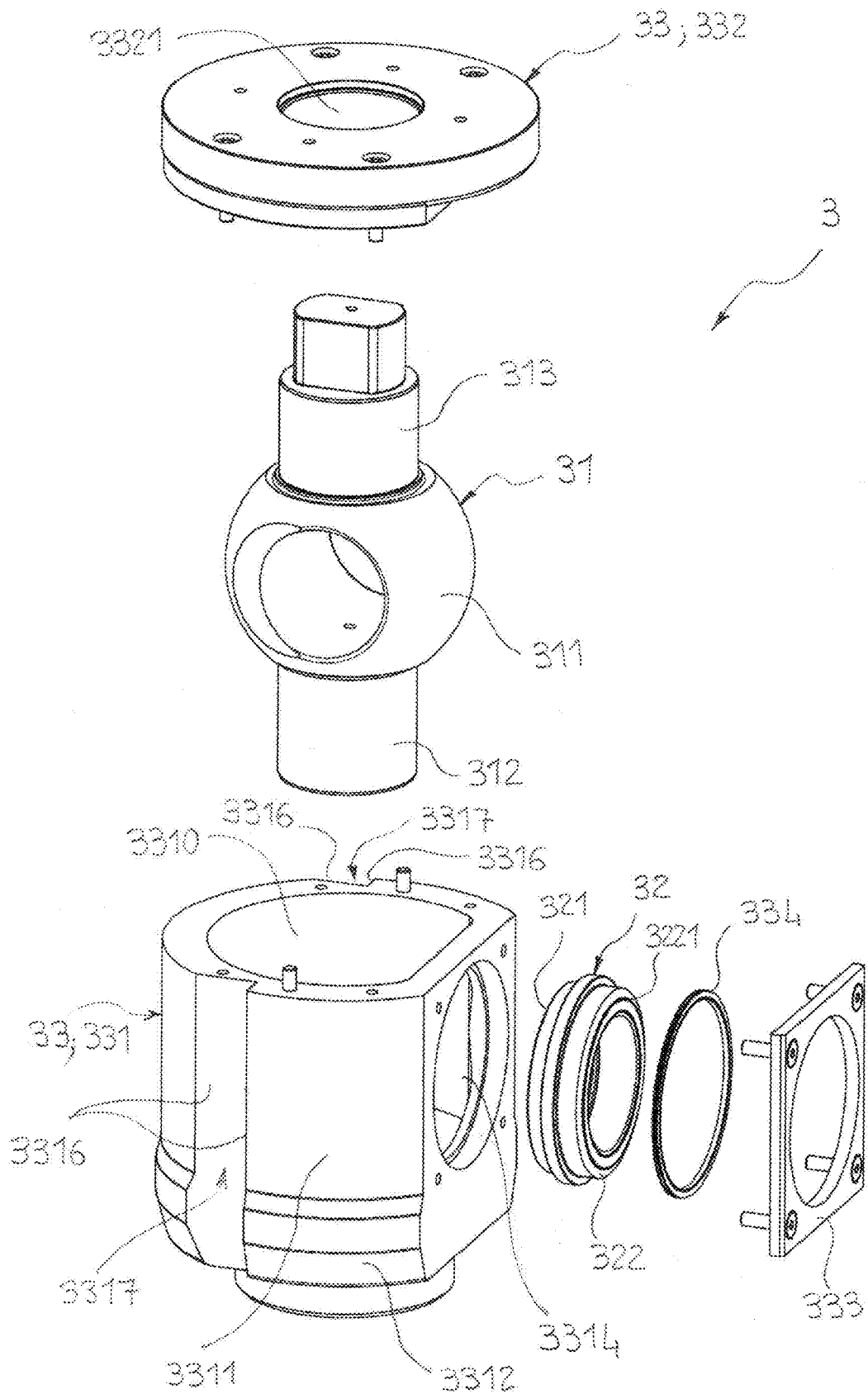
FIG. 6 is a schematic exploded perspective view of the closure member assembly of the valve in FIG. 1.

The valve closure member assembly 3, also shown separately in an exploded view in FIG. 6, comprises a ball closure member 31, a single sealing seat 32, and a support cage 33 that supports jointly the ball closure member 31 and sealing seat 32. In the assembled condition, the closure member assembly 3 forms a cartridge that can be inserted into and removed from the valve body 2 in one piece.

The support cage 33 of the closure member assembly 3 comprises a cup-shaped element 331, closed at the top by a removable cover 332.

The cup-shaped element 331 is preferably made in one piece and comprises a generically cylindrical lateral wall 3311 and a bottom wall 3312. A fluid inlet port 3313 and a fluid outlet port 3314 (visible in FIG. 6) are formed in the lateral wall 3311. In the embodiment shown here, like the ports 211, 212 of valve body 2, the fluid inlet port 3313 and the fluid outlet port 3314 have a common axis, which in the assembled condition of valve 1 coincides with axis X-X of the ports 211, 212 of valve body 2 (see FIG. 1). However, depending on the configuration of the valve body 2, the ports 3313, 3314 could also have respective non-coincident axes and/or there could be multiple fluid inlet or outlet ports. In any case, the number of fluid inlet or outlet ports of the closure member assembly 3 corresponds to the number of fluid inlet or outlet ports of the valve body 2, and in the assembled condition of valve 1 each fluid inlet or outlet port of the closure member assembly 3 is coaxial with a corresponding fluid inlet or outlet port of the valve body 2.

The cup-shaped element 331 delimits a cavity 3310 (visible in FIG. 6), in which the ball closure member 31 is removably received. Preferably, the ball closure member 31 is fully supported by the cup-shaped element 331, i.e., by the support cage 33 of closure member assembly 3.

The ball closure member 31 comprises a body 311 from which a support pin or trunnion 312 and a connecting pin 313 extend. In the embodiment shown here, the body 311 has an O-shape (closed-ball closure member). In this case, it is particularly convenient to use a single sealing seat 32 in the valve 1, as in the examples shown here, because this prevents problems of fluid trapping within the closure member assembly 3 with associated onset of overpressure, which is particularly dangerous in cryogenic processes. Alternatively, the body 311 could also have a C-shape (hemispherical closure member).

The trunnion 312 of the ball closure member 31 is intended to be received and supported in a freely rotating manner in a corresponding support cavity 3315 formed in the bottom wall 3312 of the cup-shaped element 331. The connecting pin 313, on the other hand, is intended to be connected in a rotationally integral manner to the valve stem 6 of valve 1, described in more detail below. For this purpose, in the assembled condition of the closure member assembly 3 the connecting pin 313 protrudes from the support cage 33 through an opening 3321 formed in the cover 332.

The cup-shaped element 331 also supports the sealing seat 32 of valve 1. Specifically, the sealing seat 32 is removably received, in an axially fixed manner, in the fluid outlet port 3314 of the cup-shaped element 331 and retained therein by a retaining plate 333, which is removably attached at the outer side of the lateral wall 3311 of the cup-shaped element 311 with the interposition of a thrust ring 334.

The sealing seat 32 is configured in a known way as an annular body having two axially opposed sealing faces 321, 322, each provided with a respective annular sealing element 3211, 3221. Specifically, the sealing face 321 (for the sake of clarity indicated by the corresponding reference numeral only in FIG. 6) facing towards the inside of the cup-shaped element 331 is intended to sealingly engage the ball closure member 31, while the sealing face 322 facing toward the outside of the cup-shaped element 331 is intended to sealingly engage the valve body 2.

The ball closure member 31 can rotate relative to the support cage 33 of the closure member assembly 3, and therefore also relative to the sealing seat 32 and the valve body 2, between a valve open position (see FIGS. 1b, 7, and 7a), in which the ball closure member 31 allows a fluid flow through the valve body 2, and a valve close position (see FIGS. 1, 1a, 2, 3), in which the ball closure member 31 sealingly engages the sealing seat 32 and prevents a fluid flow through the valve body 2.

Figure 7:
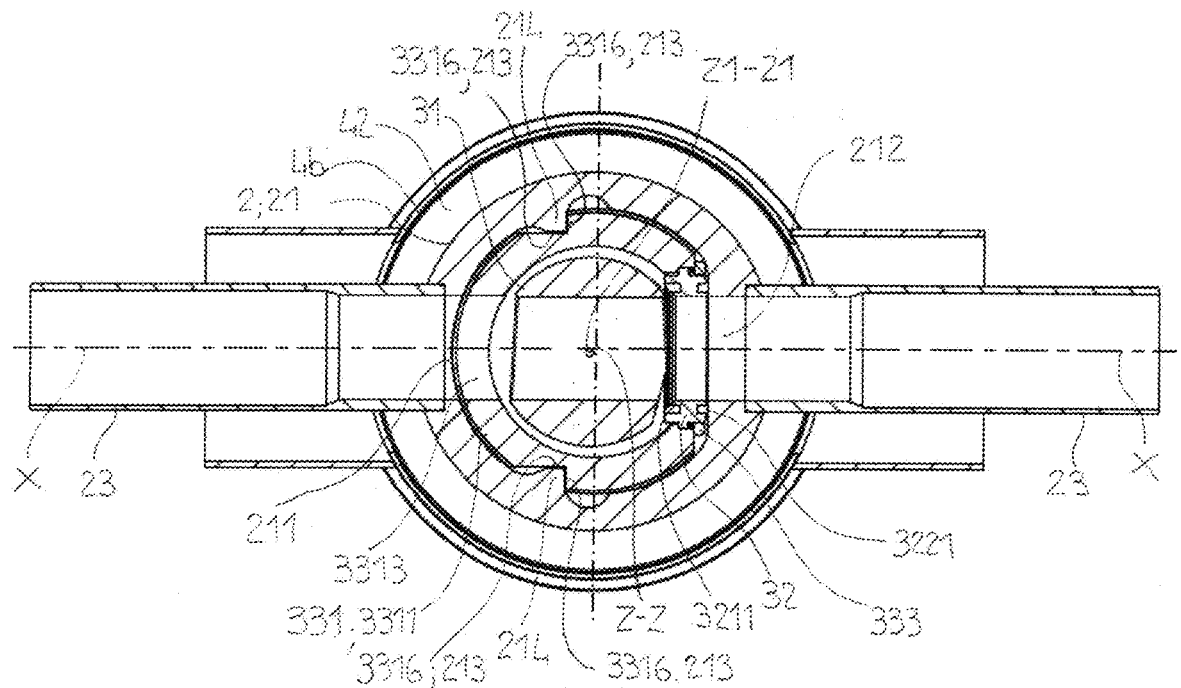
FIG. 7 is a schematic cross-sectional view of the valve in FIG. 1 at section line VII-VII in FIG. 8.
Figure 7A:
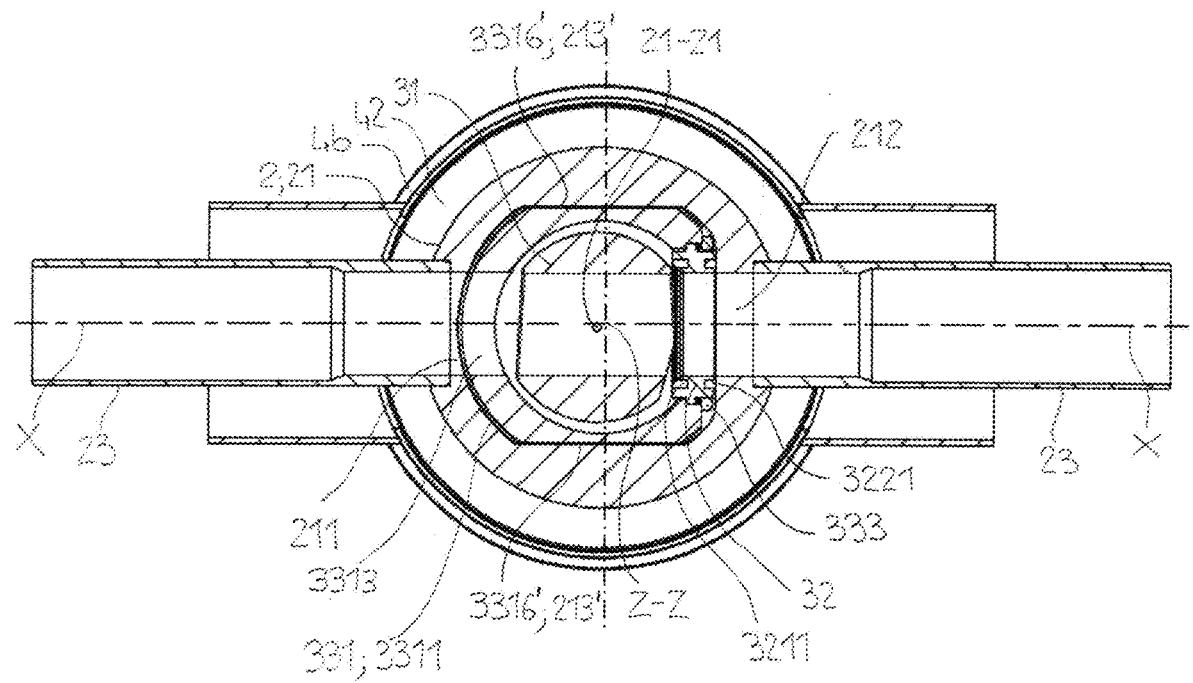
FIG. 7a is a view similar to the view in FIG. 7 showing an alternative embodiment of the valve body and the closure member assembly of the valve in FIG. 1.
Figure 8:
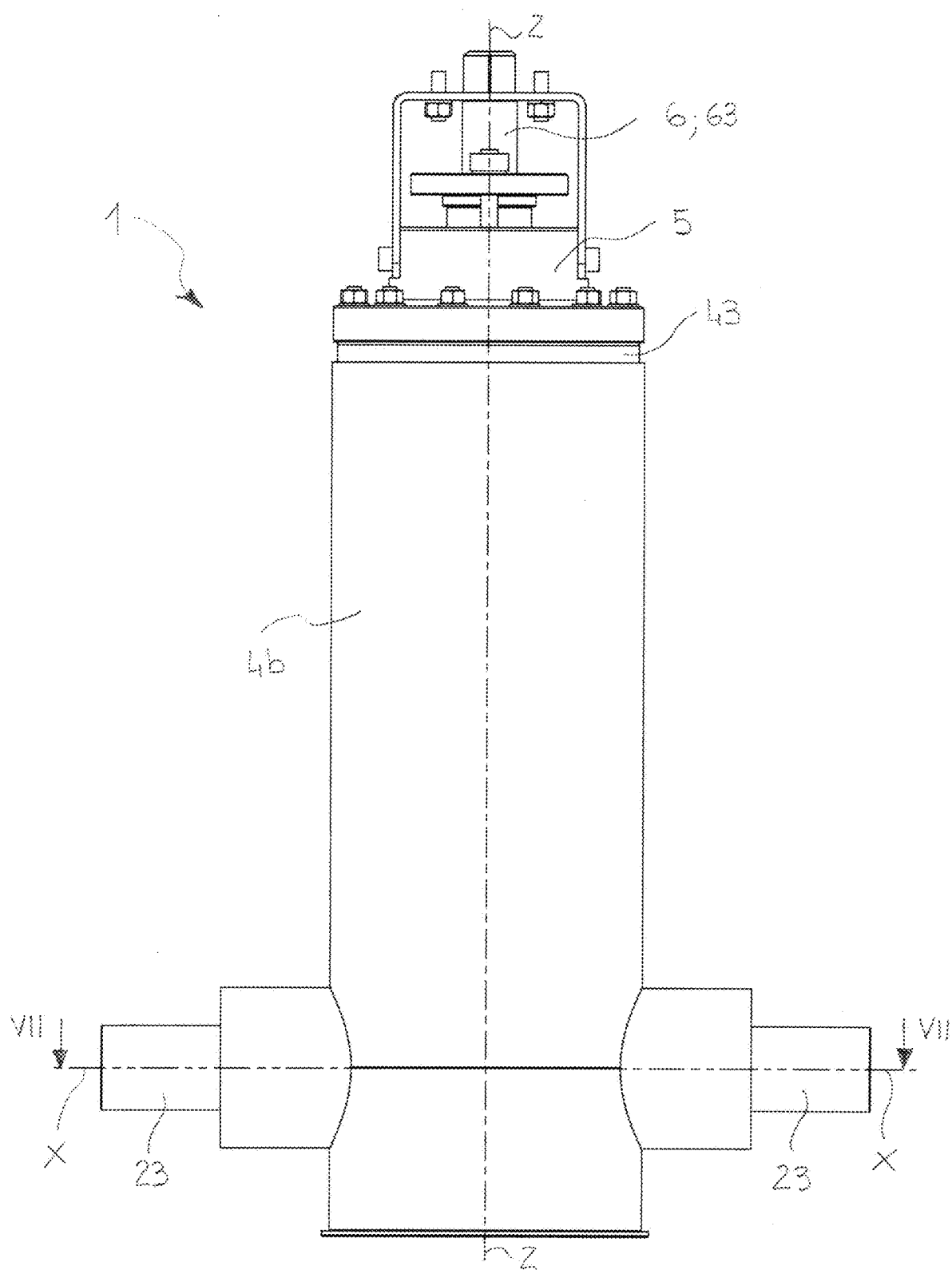
FIG. 8 is a schematic front view of the valve of FIG. 1 in a fully assembled condition.

The tightness between the ball closure member 31 and the sealing seat 32 is preferably achieved through a double eccentric configuration, whereby the ball closure member 31 has a rotation axis Z1-Z1 that is offset relative to a central axis Z-Z of the valve 1 both in an axial direction, i.e., along axis X-X, and in a transverse direction, i.e., perpendicularly to axis X-X (see FIGS. 7 and 7a). This configuration, beside ensuring high levels of tightness, particularly suitable for cryogenic applications, advantageously also allows wear of the sealing seat 32 to be minimized—and, thus, longer service lives for valve 1 to be achieved-, since the rotation of the closure member 31 from the valve open position to the valve close position and vice versa occurs without contact with the sealing seat 32, leaving out the last 3-6 degrees of the closing rotation and, correspondingly, the first 3-6 degrees of the opening rotation of the closure member 31.

As apparent from FIGS. 3-7 and 7a, the lateral wall 3311 of the cup-shaped element 331 of the support cage 33 of the closure member assembly 3 comprises, at an outer side thereof, first contact surfaces 3316, intended to abut against corresponding second contact surfaces 213 provided at the inner side of the lateral wall 21 of the valve body 2. The contact surfaces 3316 and 213 abut against each other when the closure member assembly 3 is fully received in the valve body 2, and preferably, at least partially, also during insertion of the closure member assembly 3 into the valve body 2, and prevent relative motion between the closure member assembly 3 and the valve body 2 in a peripheral, i.e., circumferential, direction thereof. Possible rotations of the closure member assembly 3 relative to the valve body 2, which can occur whenever the ball closure member 31 is subjected to an actuating torque, both under dynamic conditions, i.e., when the valve 1 is actuated, and under static conditions, for ensuring tightness in a valve closing condition when "torque seated" configurations, such as the aforementioned double eccentric configuration, are adopted, are thus avoided.

The contact surfaces 3316 and 213 do not intersect axis X-X of the fluid inlet and fluid outlet ports 3313, 3314 of the cup-shaped element 331 of the support cage 33 of the closure member assembly 3 and of the fluid inlet and fluid outlet ports 211, 212 of the valve body 2. Preferably, the contact surfaces 3316 and 213 are flat surfaces or comprise flat surfaces. Preferably, such flat surfaces are parallel or perpendicular to axis X-X.

According to an embodiment (FIGS. 3-7), the cup-shaped element 331 of the support cage 33 of the closure member assembly 3 comprises a pair of first contact surfaces 3316 delimiting respective recesses 3317 formed in the lateral wall 3311 at symmetrically opposite positions relative to axis X-X. The first contact surfaces 3316 are formed by a surface parallel to axis X-X and a surface perpendicular to axis X-X, so that the recesses 3317, viewed in a cross section, define a right angle. The recesses 3317 extend over the full height of the lateral wall 3311 (see FIGS. 4-6). Correspondingly, the valve body 2 comprises a pair of second contact surfaces 213 delimiting respective protrusions 214 formed in the lateral wall 21 at symmetrically opposite positions relative to axis X-X and having a complementary shape relative to the recesses 3317. In particular, the second contact surfaces 213 are also formed by a surface parallel to axis X-X and a surface perpendicular to axis X-X, so that the protrusions 214, viewed in a cross section, form a right edge. The protrusions 214 may extend over just a portion of the height of the lateral wall 21 (see FIG. 3).

Of course, it is also possible that the contact surfaces 3316 of the cup-shaped element 331 of the support cage 33 of the closure member assembly 3 define the protrusions and the contact surfaces 213 of the valve body 2 define the recesses. In addition, it is not excluded that the contact surfaces 3316 and 213 are or comprise curved surfaces.

According to another embodiment (FIG. 7a), the cup-shaped element 331 of the support cage 33 of the closure member assembly 3 comprises a pair of flat first contact surfaces 3316', extending parallel to axis X-X and symmetrically arranged at opposite sides of axis X-X. Correspondingly, the valve body 2 comprises a pair of flat second contact surfaces 213', also extending parallel to axis X-X and symmetrically arranged at opposite sides of axis X-X.

The valve body extension 4a of the valve 1 is formed by a cylindrical wall extending longitudinally above valve body 2 and having a diameter equal to the outer diameter of the lateral wall 21 of valve body 2. At an end longitudinally opposite to the end connected to the valve body 2, the valve body extension 4a defines the top entry opening 41 of valve 1, through which the inner chamber 40 of the valve 1 can be accessed.

The jacket 4b surrounds the valve body 2, the valve body extension 4a, and possibly also a section of the mounting fittings 23, forming around these elements a hollow space 42 which can be conveniently evacuated (vacuum jacket). At the top entry opening 41 the hollow space 42 is closed by a flange 43 that also forms a support and fastening base for the removable bonnet 5 of the valve 1. The jacket 4b can be omitted when the valve 1 is intended to operate in environments that are per se thermally insulated, such as in a cold box.

The bonnet 5 may have any suitable configuration known to the person skilled in the art and shall not be described in more detail here, as it is not relevant to the invention.

The stem 6 of the valve 1 is an extended stem, having a total length preferably of between 350 mm and 2500 mm. In any case, the stem 6 has a total length greater than the sum of the maximum extension in the longitudinal direction (heights) of the valve body 2, the valve body extension 4a, and the bonnet 5, so as to protrude out of the inner chamber 40 of the valve 1 through the bonnet 5.

Because of its length, the stem 6 is preferably made of several parts in order to reduce its weight and make its manufacturing easier. In particular, as shown in FIGS. 1 and 2, the stem 6 comprises a hollow central portion 61 and two solid end portions 62, 63 associated with the central portion 61 at longitudinal ends thereof.

The central portion 61 of the stem 6 can conveniently consist of a tubular profile with a circular cross-section and is preferably filled with a solid thermally insulating material 64 such as vetronite (glass fiber in epoxy matrix) G10-FR4. The thermally insulating material 64 preferably forms a solid body, made in one piece or several pieces.

The end portion 62 is intended to be connected to the ball closure member 31. More specifically, the end portion 62 is configured to mechanically mate in a rotationally integral manner with the connecting pin 313 of the ball closure member 31. The end portion 63, on the other hand, is intended to be connected to actuation means the valve 1 and for this purpose protrudes from the inner chamber 40 of the valve 1 through the bonnet 5.

The actuation means of the valve 1, which are not shown in the figures as they are not relevant to the invention, may be manual actuation means, such as a handwheel, or motorized actuation means, such as a gearmotor unit, and are in any case known to the person skilled in the art.

The valve 1 of the invention further comprises a thermal insulation assembly 7 removably received in the inner chamber 40 between the valve body 2 and the top entry opening 41. The function of the thermal insulation assembly 7 is to thermally separate a first region of the inner chamber 40 adjacent to the valve body 2, which under operating conditions is at cryogenic temperature, from a second region of the inner chamber 40 adjacent to the top entry opening 41 and the bonnet 5, which under operating conditions may instead be at higher temperatures, such as room temperature. In particular, the thermal insulation assembly 7 is configured to substantially limit conductive and convective heat transfer that may arise in the inner chamber 40 due to the temperature difference between the two regions mentioned above.

As apparent from FIGS. 1-5, the thermal insulation assembly 7 has overall a cylindrical annular configuration and concentrically surrounds the stem 6 in the inner chamber 40. The stem 6 extends longitudinally through thermal insulation assembly 7 without mechanical interference and can therefore be freely rotated and translated relative to the thermal insulation assembly 7.

More specifically, the thermal insulation assembly 7 comprises a containment chamber 71 having a cylindrical annular shape, coaxial to the stem 6. The containment chamber 71 is filled with a solid thermally insulating material 72, e.g., vetronite G10-FR4. The thermally insulating material 72 preferably forms a solid body, made in one piece or several pieces.

In transverse direction, i.e., laterally, the containment chamber 71 is delimited internally by a circular tubular element 711 and externally by a cylindrical wall 712. In longitudinal direction, i.e., at the top and bottom, the containment chamber 71 is delimited by a pair of flat annular walls 713 parallel to each other (see FIG. 5).

The tubular element 711, the cylindrical wall 712, and the annular walls 713 are rigidly connected to one another, e.g., by welding, and form together a rigid structure for supporting and containing the thermally insulating material 72.

The tubular element 711, which also defines a central channel of the thermal insulation assembly 7 through which the stem 6 extends longitudinally, preferably has an inner diameter only slightly larger than the largest diameter D of the stem 6. Similarly, the cylindrical wall 712 preferably has an outer diameter only slightly smaller than the diameter of the inner chamber 40 of the valve 1. At the outer side thereof, the cylindrical wall 712 may comprise one or more perimeter contact rings 7121 (indicated by the corresponding reference numeral only in FIGS. 4 and 5 for the sake of clarity), through which the containment chamber 71 locally contacts the wall of the inner chamber 40, i.e., the valve body extension 4a of the valve 1. The contact rings 7121 are preferably made of a plastic material and are intended to block any convective motion in the hollow space formed between the containment chamber 71 and the valve body extension 4a, between the above-mentioned regions of the inner chamber 40, which under operating conditions of the valve 1 are at different temperatures.

In any case, considering the minimal transverse clearances and the small wall thicknesses of the tubular element 711 and the cylindrical wall 712, the cross-sectional area of the free volume of the inner chamber 40 is substantially completely taken up by the thermally insulating material 72 present in the containment chamber 71.

The containment chamber 71 preferably has a length of between 0.65·L and 0.85·L, where L is the total length of the inner chamber 40, i.e., of the valve body extension 4a.

The tubular element 711 has a length greater than the length of the containment chamber 71 and protrudes axially from an end thereof. The protruding portion of the tubular element 711 has a flanged end 7111, through which the tubular element 711, and thus the thermal insulation assembly 7 as a whole, can be removably connected, for example by means of screws 74, to the cover 332 of the support cage 33 of the closure member assembly 3.

Figure 4:
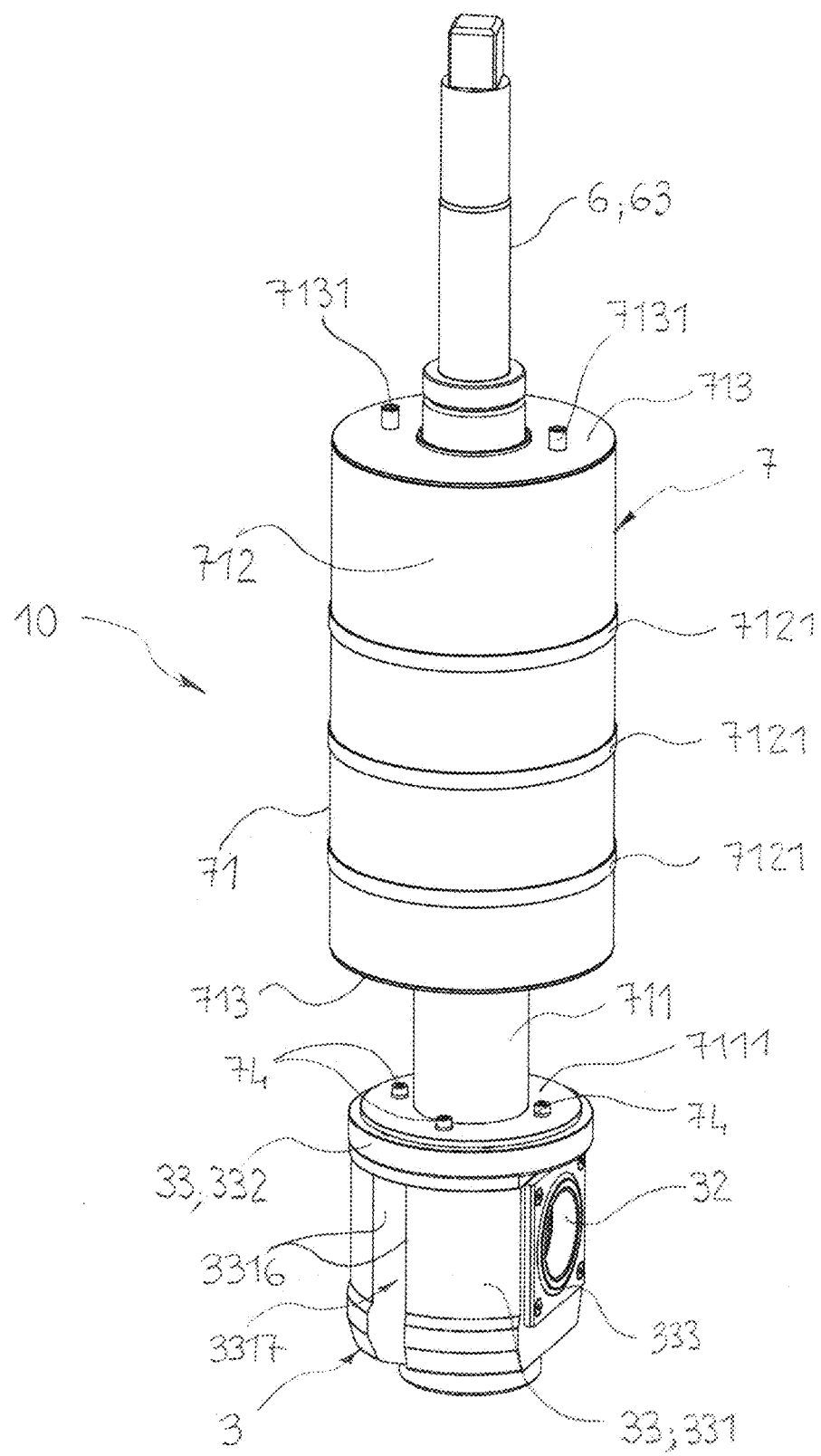
FIG. 4 is a schematic perspective view of a removable unit of the valve in FIG. 1.

In the assembled condition of valve 1, therefore, the closure member assembly 3, the thermal insulation assembly 7, and the stem 6, which is removably connected to the closure member assembly 3 as described above, form a removable unit 10, also shown separately in FIG. 4, which can be inserted/extracted in one piece into/from the inner chamber 40 of valve 1, by acting on the thermal insulation assembly 7.

To this end, the thermal insulation assembly 7 is preferably provided with fixed or removable attachment means to facilitate gripping and handling of the removable unit 10, either manually or by lifting machinery. In the embodiment shown here, for example, the thermal insulation assembly 7 comprises a pair of threaded bushings 7131 externally secured to the annular wall 713 of the containment chamber 71 located at an opposite side relative to the closure member assembly 3, to which eyebolts 73 can be temporarily screwed (see FIGS. 2 and 3).

The valve 1 thus allows the closure member assembly 3 to be extracted and inserted again for inspection, servicing, or replacement operations particularly easily and quickly, despite the extended stem configuration and the presence of the thermal insulation assembly 7, even when the valve 1 itself is installed in a line.

Figure 3:
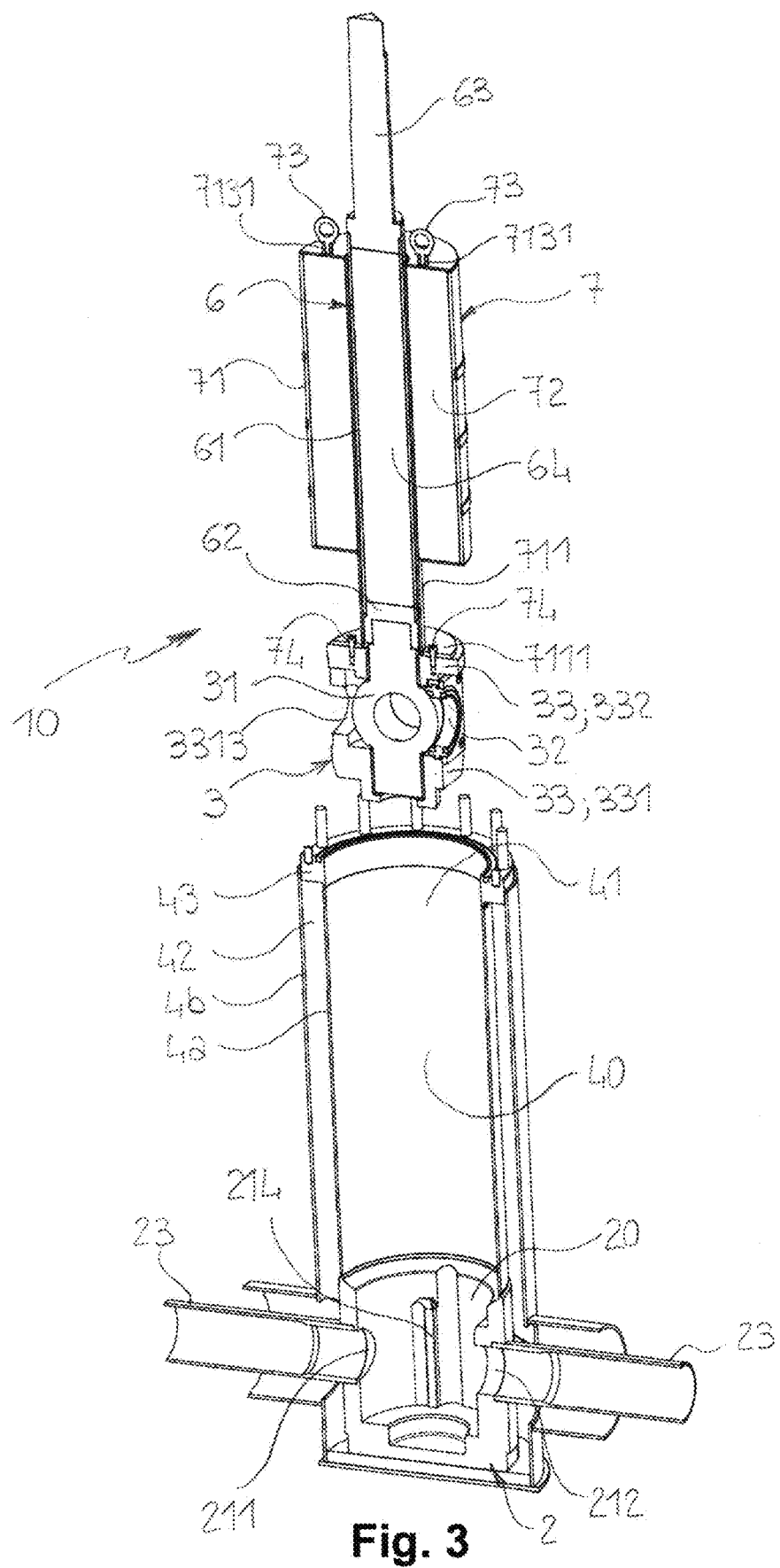
FIG. 3 is a view similar to the view in FIG. 2, partially exploded.
Figure 5:
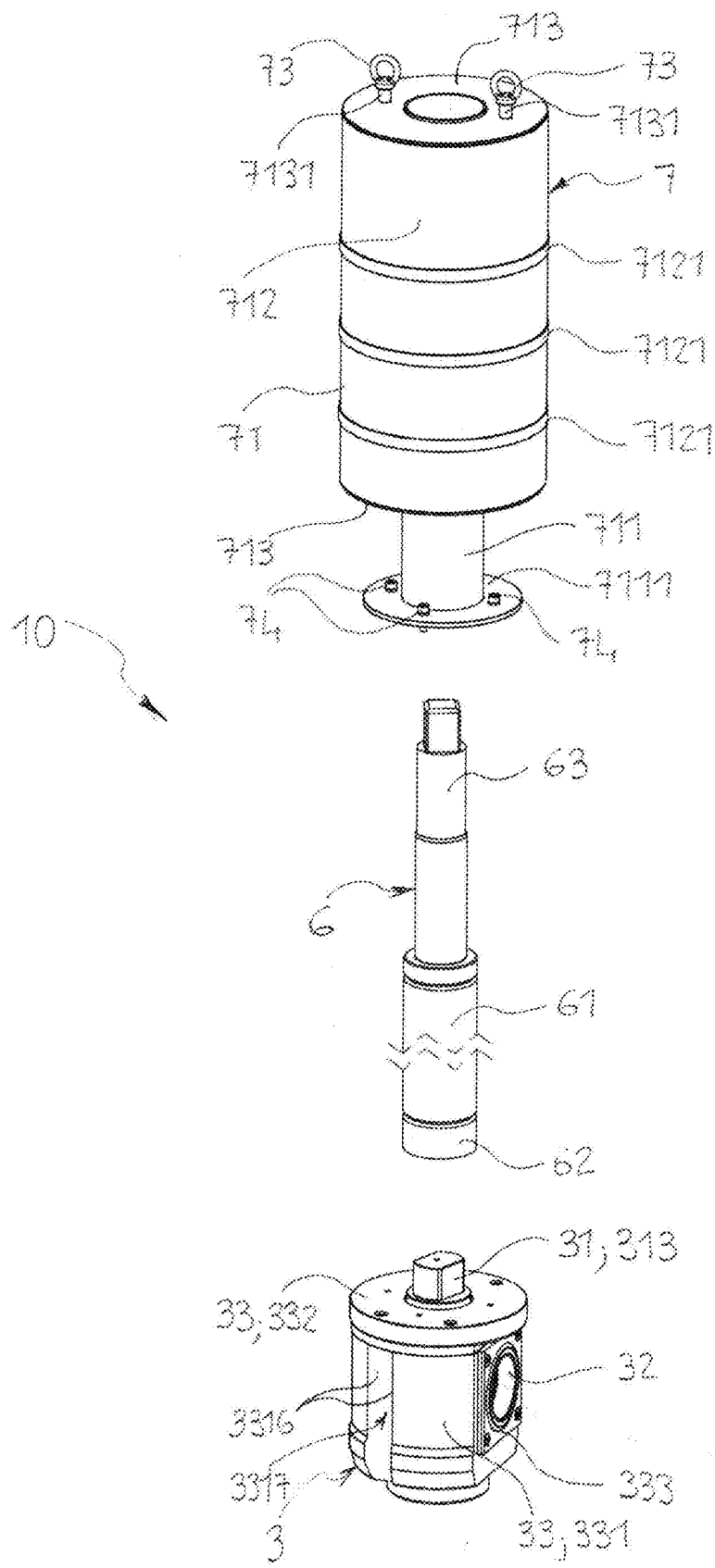
FIG. 5 is a schematic partially exploded perspective view of the removable unit in FIG. 4.

Referring in particular to FIGS. 2, 3, and 5, by way of example the steps for extracting the closure member assembly 3 from the valve 1 shall now be described in more detail.

In a first step, the bonnet 5 of the valve 1 is removed, so as to clear the top entry opening 41 of the valve 1 and expose the upper side, i.e., the side opposite to the closure member assembly 3, of thermal insulation assembly 7 (FIG. 2).

In a subsequent step, eyebolts 73 are screwed into the threaded bushings 7131 (FIG. 2).

In a further subsequent step, the removable unit 10 formed by the closure member assembly 3, the stem 6, and the thermal insulation assembly 7, is extracted, either manually or with the aid of suitable lifting machines and by using eyebolts 73, from the inner chamber 40 of the valve 1 (FIG. 3).

Once the removable unit 10 is extracted from the valve 1, it can be disassembled (FIG. 5). Preferably, the thermal insulation assembly 7 is first removed by unscrewing the screws 74 connecting the flanged end 7111 of the tubular element 711 to the cover 332 of the support cage 33 of the closure member assembly 3, and then the stem 6 and the closure member assembly 3 are separated from each other. Alternatively, if allowed by the mechanical connection between the stem 6 and the connecting pin 313 of the ball closure member 31, the stem 6 can first be removed by pulling it out through thermal insulation assembly 7, and then the latter can be separated from the closure member assembly 3 as described above.

In any case, when the removable unit 10 is disassembled, it is possible to freely work on the closure member assembly 3, either on site or in a factory, for inspection or servicing operations, or it can be replaced.

For reassembling the removable unit 10 and inserting it into the valve 1, the same steps described above are performed in a reverse sequence.

During the insertion step, in particular, properly centering the closure member assembly 3 within the cavity 20 of the valve body 2, especially when the valve 1 is mounted at an angle in a line, is advantageously made easier by the cooperation between the contact surfaces 3316 or 3316' of the closure member assembly 3 and the contact surfaces 213 or 213' of the valve body 2 described above, if they are configured to abut at least partially against each other already during the insertion of the closure member assembly 3 into the valve body 2.

Figure 9:
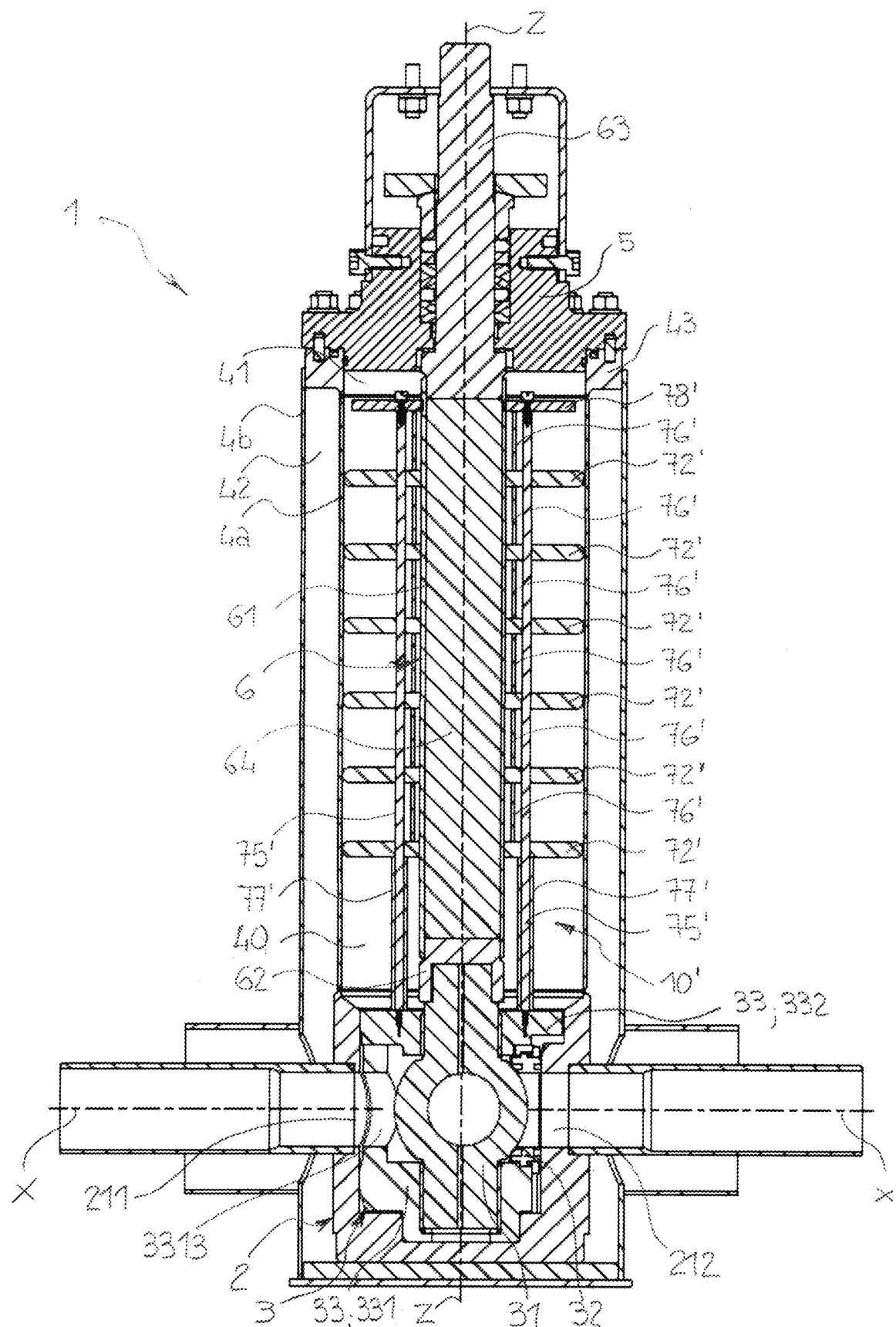
FIG. 9 is a schematic longitudinal sectional view of another embodiment of a cryogenic ball valve as disclosed herein.
Figure 10:
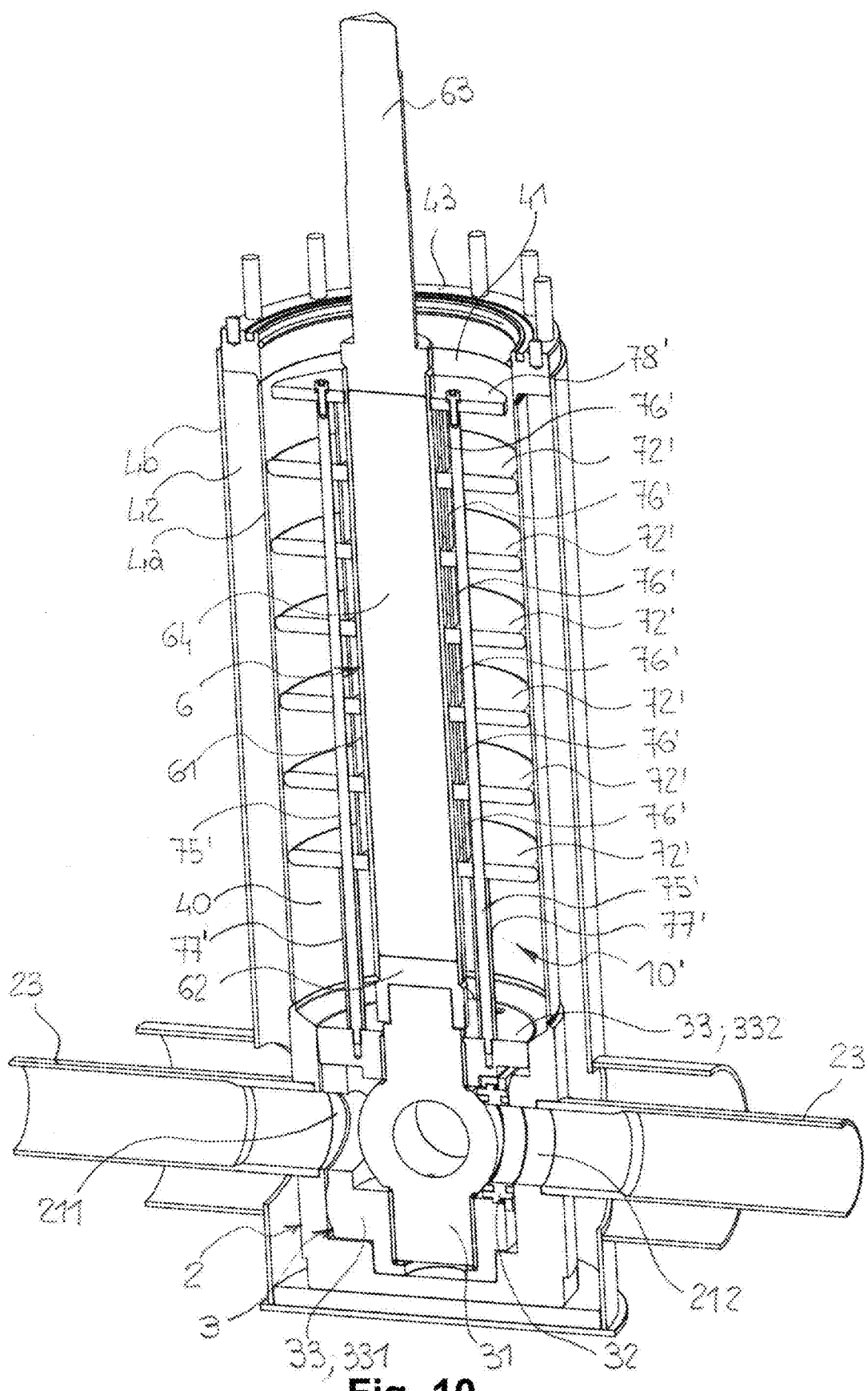
FIG. 10 is a schematic perspective view in longitudinal section of the valve in FIG. 9.
Figure 11:
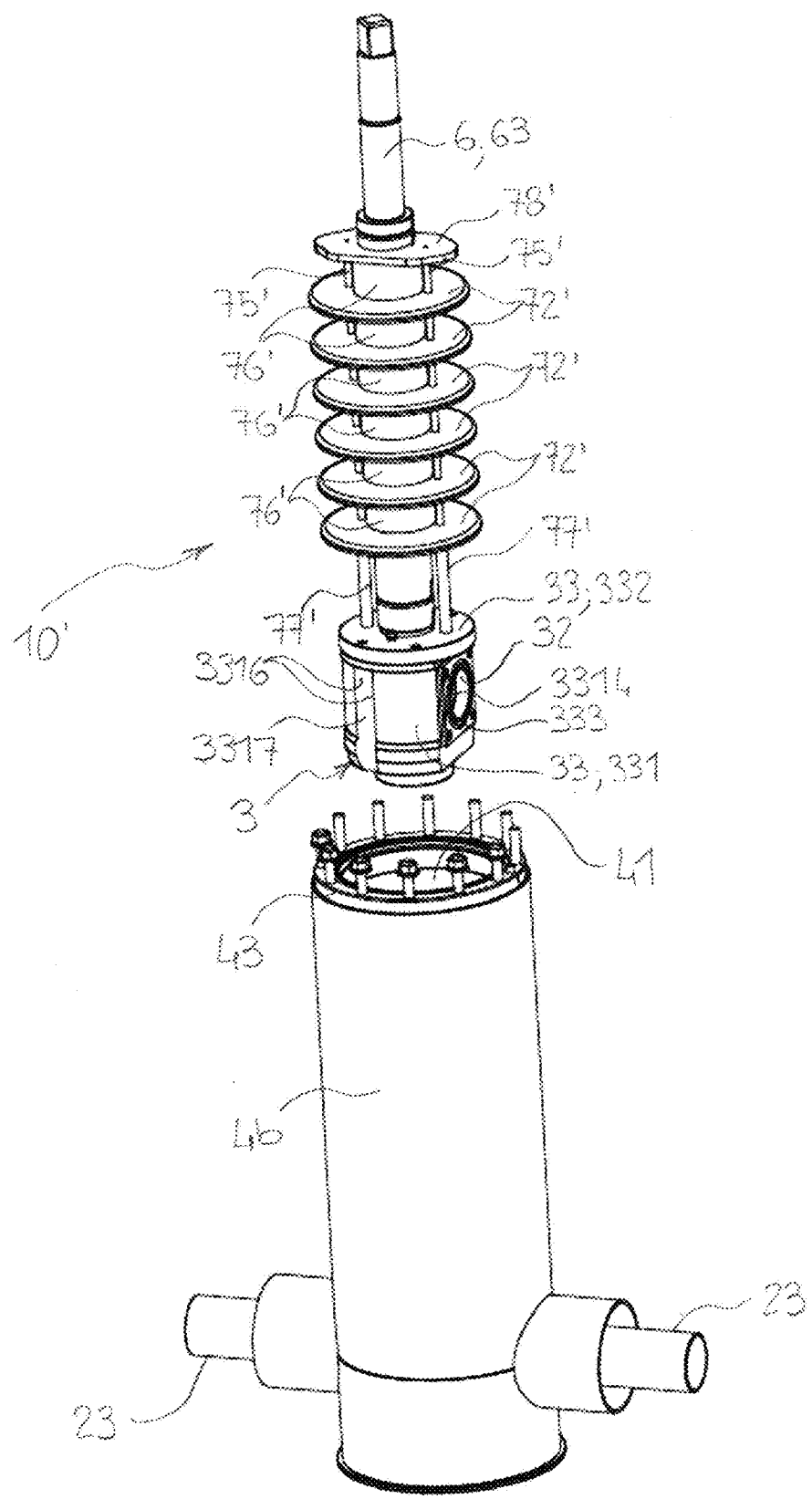
FIG. 11 is a schematic partially exploded perspective view of the valve in FIG. 9.

FIGS. 9-11 show another embodiment of the valve 1, which differs from the embodiment described above with reference to FIGS. 1-8 in the configuration of the thermal insulation assembly. Same components as those in the embodiment of FIGS. 1-8 bear the same reference numerals and shall not be described again here.

In this embodiment, the valve 1 comprises a thermal insulation assembly 7' configured as a stack of annular disks 72' made of a thermally insulating material, longitudinally spaced apart from each other and preferably identical to each other. The annular disks 72' can be made, for example, of vetronite G10-FR4.

Also in this case, the thermal insulation assembly 7' has overall a cylindrical annular configuration, although discrete in the longitudinal direction, and concentrically surrounds the stem 6 in the inner chamber 40. The stem 6 extends through thermal insulation assembly 7' without mechanical interference and can be freely rotated and translated relative to it.

Each annular disk 72' has a circular central opening for the stem 6 and an outer edge, also circular. The central opening has a diameter preferably only slightly larger than the largest diameter D of the stem 6. The outer edge has a diameter preferably only slightly smaller than the diameter of the inner chamber 40 of the valve 1. Thus, the annular disks 72' have a cross-sectional area substantially equal to the cross-sectional area of the free volume of the inner chamber 40.

The annular disks 72' are assembled in a stack and supported in the inner chamber 40 of the valve 1 by means of a pair of rods 75' and a plurality of spacer rings or cylinders 76', 77'. Each rod 75' has threaded ends, which allow, on the one hand, the rod to be removably attached to the cover 332 of the support cage 33 of the closure member assembly 3, and, on the other hand, removable attachment of a head plate 78', which closes the stack of annular disks 72' at the top. Each annular disk 72' has a pair of through holes through which the rods 75' extend. The annular disk 72' which in the assembled condition of the valve 1 faces the valve body 2 is longitudinally spaced apart therefrom preferably by means of a pair of spacer cylinders 77' mounted concentrically to each rod 75'. Within the stack, the annular disks 72' and the head plate 78' are instead longitudinally spaced apart from each other preferably by means of spacer rings 76' mounted concentrically to the stem 6.

The stack of disk 72' has a total length, measured between the annular disk 72' facing the valve body 2 and the annular disk 72' facing the head plate 78', preferably between $0.65 \cdot L$ and $0.85 \cdot L$, where L is the total length of the inner chamber 40.

Also in this embodiment, in the assembled condition of the valve 1, the closure member assembly 3, the thermal insulation assembly 7', and the stem 6 form a removable unit 10', which can be inserted/extracted in one piece into/from the inner chamber 40 of valve 1 by acting on the thermal insulation assembly 7'.

For this purpose, the thermal insulation assembly 7' can be provided with fixed or removable attachment means (not shown) for making gripping and removal of the removable unit 10' easier, as described with reference to the embodiment in FIGS. 1-8.

The closure member assembly 3 can be removed from valve 1 through steps similar to those previously described with reference to the embodiment of FIGS. 1-8. In this case, however, separating the thermal insulation assembly 7' from the closure member assembly 3 requires at least partially disassembling the thermal insulation assembly 7'.

The present invention thus provides a cryogenic ball valve with an extended configuration that can simultaneously provide high flow rates with low pressure drops, effective thermal separation between valve parts operating at different temperatures, and ease of servicing even when installed in a line. These features are particularly advantageous for using the valve of the invention in a cold box.

What is claimed is:

1. A cryogenic ball valve, comprising:
a valve body comprising a fluid inlet port and a fluid outlet port having a respective axis;
a valve body extension delimiting, together with the valve body, a valve inner chamber and defining a valve top entry opening;
a removable bonnet closing the top entry opening;
a closure member assembly removably received in the valve body and comprising a ball closure member, a sealing seat, and a support cage supporting the ball closure member and the sealing seat,
wherein the ball closure member is configured to rotate relative to the valve body, the support cage, and the sealing seat between a valve open position, in which the ball closure member allows a fluid flow through the valve body, and a valve closed position, in which the ball closure member sealingly engages the sealing seat and prevents a fluid flow through the valve body;
an extended stem comprising a first end connected to the ball closure member and a second end protruding from the inner chamber through the removable bonnet;
a thermal insulation assembly removably received in the inner chamber and configured to thermally separate a first region of the inner chamber adjacent to the valve body from a second region of the inner chamber adjacent to the top entry opening,
wherein the closure member assembly, the stem, and the thermal insulation assembly form a removable unit configured to be inserted/removed in one piece into/from the inner chamber through the top entry opening,
wherein the support cage comprises a cup-shaped element having a lateral wall laterally surrounding the ball closure member and comprising a fluid inlet port and a fluid outlet port respectively coaxial with the fluid inlet port and the fluid outlet port of the valve body, and a bottom wall supporting the ball closure member,
wherein the lateral wall of the cup-shaped element comprises, at an outer side thereof, at least one first contact surface, and the valve body comprises, at an inner side of a lateral wall thereof, at least one second contact surface,
wherein the at least one first contact surface and the at least one second contact surface do not cross the axes of the fluid inlet ports and of the fluid outlet ports of the cup-shaped element and of the valve body, and
wherein the at least one first contact surface and the at least one second contact surface abut against each other preventing displacements of the closure member assembly and the valve body relative to each other in a peripheral direction thereof.

2. The cryogenic ball valve of claim 1, wherein the second end protruding from the inner chamber through the removable bonnet is connected to valve actuation means.

3. The cryogenic ball valve of claim 1, wherein the thermal insulation assembly has an annular configuration and the stem longitudinally extends through the thermal insulation assembly.

4. The cryogenic ball valve of claim 1, wherein the thermal insulation assembly comprises thermal insulation means and support and/or containment means of the thermal insulation means, and wherein the support and/or containment means are removably connected to the support cage of the closure member assembly.

5. The cryogenic ball valve of claim 4, wherein the thermal insulation means have cross-sectional surface area substantially equal to a cross-sectional surface area of a free volume in the inner chamber.

6. The cryogenic ball valve of claim 4, wherein the thermal insulating means longitudinally extend, continuously or discontinuously, in the inner chamber over a length of between $0.65 \cdot L$ and $0.85 \cdot L$, wherein L is the total length of the inner chamber.

7. The cryogenic ball valve of claim 4, wherein the support and/or containment means of the thermal insulation means comprise a tubular annular containment chamber and the thermal insulation means fill the containment chamber.

8. The cryogenic ball valve of claim 4, wherein the thermal insulation means comprise two or more annular disks made of a thermally insulating material and arranged longitudinally spaced apart from each other.

9. The cryogenic ball valve of claim 1, wherein the ball closure member comprises a trunnion.

10. The cryogenic ball valve of claim 1, wherein the ball closure member has a rotation axis having an offset relative to a center axis of the valve along two mutually perpendicular directions in a plane perpendicular to the rotation axis and center axis.

11. The cryogenic ball valve of claim 1, wherein the stem comprises a hollow portion.

12. The cryogenic ball valve of claim 11, wherein the hollow portion is filled with a thermally insulating material.

13. The cryogenic ball valve of claim 1, further comprising a jacket enclosing the valve body extension and the valve body.

14. The cryogenic ball valve of claim 13, wherein the jacket forms an evacuated hollow space about the valve body extension and the valve body.

* * * * *